United States Patent [19]
Teagno et al.

[11] Patent Number: 5,884,367
[45] Date of Patent: Mar. 23, 1999

[54] SELF-LOCKING CABLE TIE STRAP WITH A SYMMETRICAL STRUCTURE

[75] Inventors: Vladimiro Teagno, Turin, Italy; Peter M. Wells, Jr., Germantown; Wasim Khokhar, Cordova, both of Tenn.

[73] Assignee: Thomas & Betts Corporation, Memphis, Tenn.

[21] Appl. No.: 689,466

[22] Filed: Aug. 9, 1996

[30] Foreign Application Priority Data

Aug. 22, 1995 [IT] Italy ................................. RM95A0572
Sep. 28, 1995 [IT] Italy ................................. RM95A0648

[51] Int. Cl.$^6$ .................................................. B65D 63/00
[52] U.S. Cl. ...................................... 24/16 PB; 24/30.5 P
[58] Field of Search ................................. 24/16 R, 16 PB, 24/30.5 P, 17 A, 17 AP, 30.5 R; 248/74.3

[56] References Cited

U.S. PATENT DOCUMENTS

| | | |
|---|---|---|
| 3,102,311 | 9/1963 | Martin et al. . |
| 3,103,666 | 9/1963 | Bone . |
| 3,457,598 | 7/1969 | Mariani . |
| 3,537,146 | 11/1970 | Caveney . |
| 3,588,962 | 6/1971 | Feldberg . |
| 3,735,448 | 5/1973 | Waddington . |
| 3,816,879 | 6/1974 | Merser et al. ......................... 24/16 PB |
| 3,949,449 | 4/1976 | Caveney et al. . |
| 3,952,373 | 4/1976 | Noorily . |
| 3,965,538 | 6/1976 | Caveney et al. . |
| 3,967,345 | 7/1976 | Sumimoto . |
| 3,976,108 | 8/1976 | Caveney et al. . |
| 4,245,374 | 1/1981 | Suzuki ................................. 24/16 PB |
| 4,417,656 | 11/1983 | Kato . |
| 4,456,123 | 6/1984 | Russell . |
| 4,631,782 | 12/1986 | Gecs . |
| 4,640,319 | 2/1987 | Walker . |
| 4,640,320 | 2/1987 | Avison et al. . |
| 4,683,920 | 8/1987 | Furutsu . |
| 4,688,302 | 8/1987 | Caveney et al. . |
| 4,712,677 | 12/1987 | Russell . |
| 4,754,529 | 7/1988 | Paradis ................................. 24/16 PB |
| 4,790,225 | 12/1988 | Moody et al. . |
| 5,042,535 | 8/1991 | Schlottke . |
| 5,146,654 | 9/1992 | Caveney et al. . |
| 5,205,328 | 4/1993 | Johnson et al. . |
| 5,317,787 | 6/1994 | Fortsch ................................. 24/16 PB |

FOREIGN PATENT DOCUMENTS

| | | |
|---|---|---|
| 0611038 | 8/1974 | European Pat. Off. . |
| 0469908 | 2/1992 | European Pat. Off. . |
| 0 571 666 A1 | 5/1992 | European Pat. Off. . |
| 2082115 | 12/1971 | France . |
| 2089514 | 1/1972 | France . |
| 2302435 | 9/1976 | France . |
| 2139091 | 3/1972 | Germany . |
| 1383912 | 2/1974 | United Kingdom . |
| WO 8906328 | 7/1989 | WIPO . |

*Primary Examiner*—James R. Brittain
*Attorney, Agent, or Firm*—Hoffmann & Baron, LLP

[57] ABSTRACT

The cable tie strap, having elongate strap body and a locking head provides for receipt of the cable tie strap in the head in either direction. The cable tie strap includes a hollow locking head and an elongate strap having toothing on each side of the strap. A locking bar is positioned within the hollow head. The strap body may be inserted into the hollow head in either direction. The locking bar is lockingly engagable with the toothing on either side of the strap upon insertion of the strap into the head in either direction.

12 Claims, 13 Drawing Sheets

SELF-LOCKING CABLE TIE STRAP WITH A SYMMETRICAL STRUCTURE

FIELD OF THE INVENTION

The present invention relates to a self-locking cable tie strap with symmetrical structure.

BACKGROUND OF THE INVENTION

In the state of the art are well-known self-locking cable tie straps for binding together in a bundle wires or cables for the realization of harnesses of any kind.

The cable tie straps according to the known art comprise a head part provided with a retaining tooth or pawl, sometimes realized with a metallic insert, arranged to cooperate with a flexible member integral with the head and provided with a toothing on one side arranged for engaging in an irreversible way the retaining tooth or pawl at the moment of the fastening of the bundle of cables and wires. These tie straps according to the prior art have the tooth or pawl in the head that operate in a unidirectional way and are arranged to cooperate with the toothing on the flexible member or tail that is provided with the toothing on one side only.

This known construction of the self-locking tie straps with an irreversible locking entails that owing to the asymmetrical structure of the same, at the moment of their application for the binding of cables or wires it is necessary to pay attention to the direction of insertion of the flexible member or tail to ensure correct engagement and locking with the head.

There are also known members for the temporary locking of electrical wires with a releasable locking with a symmetrical structure used for the temporary locking of electrical cords of electrical or electronic apparatus during the packaging, having a symmetrical structure that is however not suitable for assemblies of the industrial type and that do not show the capabilities of locking and safety of locking of the cable tie straps for industrial use mentioned above.

It is also to be remarked that in the cable tie straps for industrial use to which the present invention is mainly referred, the known asymmetrical structure does not shown inconveniences when these straps are applied by hand; a minimum amount of attention on the part of the operator is sufficient.

However, in the case of binding machines of the industrial type, the asymmetry of the known cable tie straps entails several serious inconveniences. The cable tie straps according to the prior art owing to the asymmetry cause a partially free binding at the base of connection of the flexible part or tail with the head part. This free part at the base of the head assumes a more or less acute angle in relation to the pull exerted at the binding and related to the diameter of the cables, straining the material of the strap at the connection part with the head possible development of nicks or breakage at the connection base.

The straps according to the prior art are provided as tapes to allow the feeding of the tapes to an automatic binding tool.

The asymmetrical shape of the straps according to the prior art fed from an auxiliary distributor is the main origin of jamming of the mechanism of the auxiliary distributor as well as of the binding tool and the feeding conduit, since the feeding method is based on a transfer of the strap along a closed path by fluid propulsion (compressed air). The orientation of the strap is consequently extremely important to ensure the receiving of the strap within the binding tool into a correct position.

In order to ensure the correct orientation, systems according to the prior art use a flexible tube having a square or rectangular cross section that reproduces the outline of the head of the strap and consequently the strap inserted into an auxiliary device of the distributor is "shot" along the piping by means of a jet of air, maintaining its orientation.

This method that seems correct became critical and causes inconvenience when there is impressed a torsion to the square section piping or when the piping itself is bent with a radius shorter than a given limit.

SUMMARY OF THE INVENTION

It is therefore an aim of the present invention to provide a strap in plastic material having a symmetrical shape for the binding of cable that allows the introduction of the flexible portion (tongue) through the head from both sides rendering easier in this way the orientation of the strip fed by a jet of air along a tubing.

The symmetry of the strap allows therefore its travel in a piping having a round cross section eliminating any problem of jamming along a path determining the orientation of the strip with a spontaneous rotation (+90°, −90°) at the entry of the binding tool.

It is another aim of the present invention to provide a symmetrical strap shaped as a hammer where the connection point of the flexible portion or tail, provided with toothing on both sides, to the head portion with openings on both sides, is radiuses with a symmetrical radius eliminating the narrow angle open zone and possible cracks or breakage for tensile stress.

It is another aim of the present invention to provide a symmetrical strap where the binding locking is determined by a part internal to the head located on the same axis with the flexible part or tail and by an opposite retaining tooth where the internal portion assumes a correct locking angle owing to the insertion of the tongue through the head in a sense or the other and where when the tension has been impressed by elastic deformation of the tongue the opposite tooth engages further the opposite tooth.

Other aims, features and advantages of the cable tie strap according to the present invention will become clear from the following disclosure that shows exemplary and non-limiting embodiments of the invention and from the figure of the attached drawings, wherein:

DETAILED DESCRIPTION OF THE PREFERRED EMBODIMENT

Figure 1:
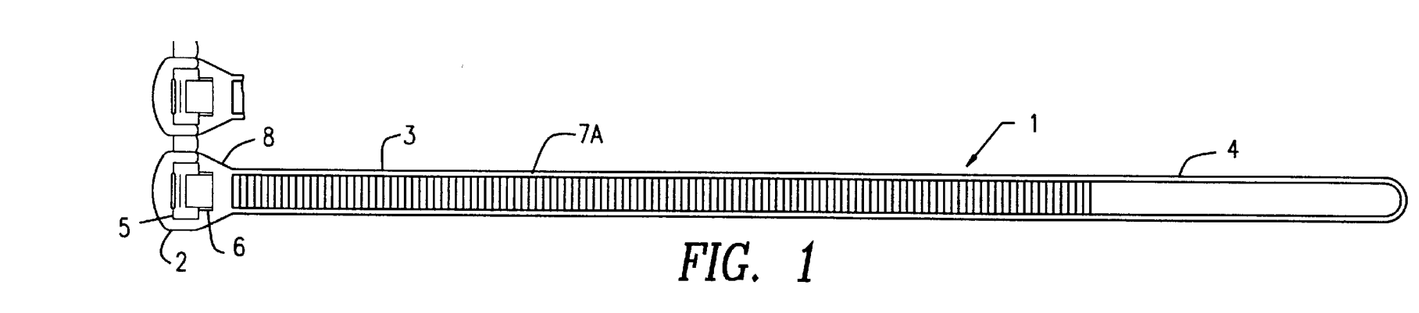
FIG. 1 shows a plan view of the self-locking cable tie strap having a symmetrical structure according to the present invention.
Figure 2:
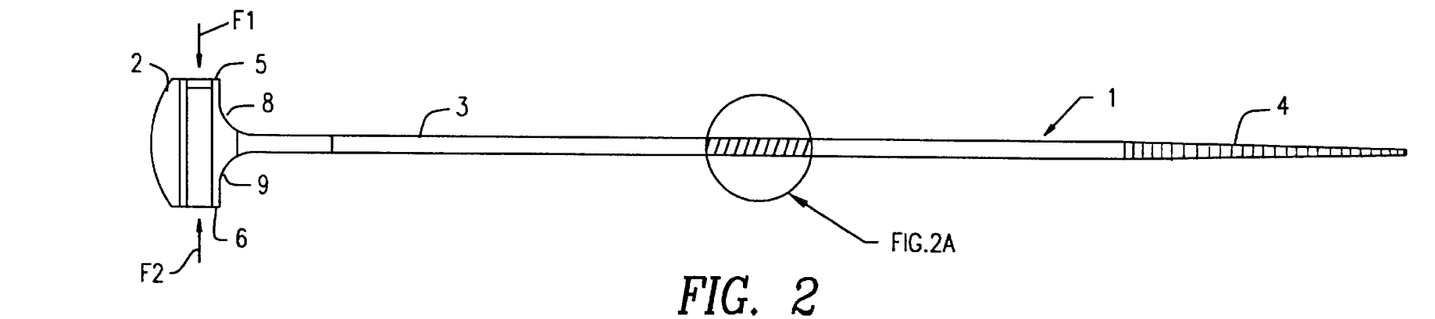
FIG. 2 shows a lateral view, partially sectioned of the cable tie strap of FIG. 1.
Figure 2A:
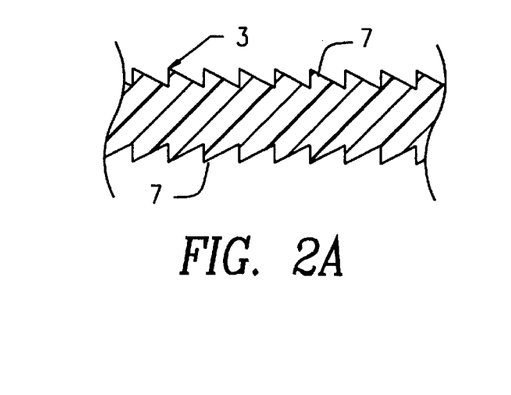
FIG. 2A shows an enlarged detail of the strap shown in FIG. 2.

With reference to the drawings and in particular to FIGS. 1, 2, 2A, the cable tie straps shown as a whole in 1 comprises a symmetrical head part 2, shaped as a hammer and a tail part 3 ending in a tail end 4. As it will be better shown in the following, both the head 2, and the tail 3 have a mirror-like symmetrical structure, thanks to which the very end of the tail 4 of the strap 1 may be inserted within the locking cavity 5 of the head 2 either on the right side or on the left side, as it is shown by the arrows F1, F2 in FIG. 2. The locking action of the tongue 3 within the head 2 is performed by effect of the positive locking by a symmetrical tooth or pawl 6 that cooperates with a double sawtooth toothing 7A, 7B realized on both the larger sides of the tail 3. As it is usual, the tail end 4 of the strap 1 is without toothing and tapered to facilitate its insertion into the head 2 of the strap 1 in the initial steps of the locking operations of a bundle of cables or conductors.

In a preferred embodiment, the connection part 8, 9 is radiuses with a radius R for a better distribution of the bending stresses at the moment of locking of the strap on a bundle of cables and for preventing its breakage near the head owing to large stresses that may occur, as mentioned above, at the moment of fastening, or during the useful life of the strap in the operative conditions.

Figure 3:
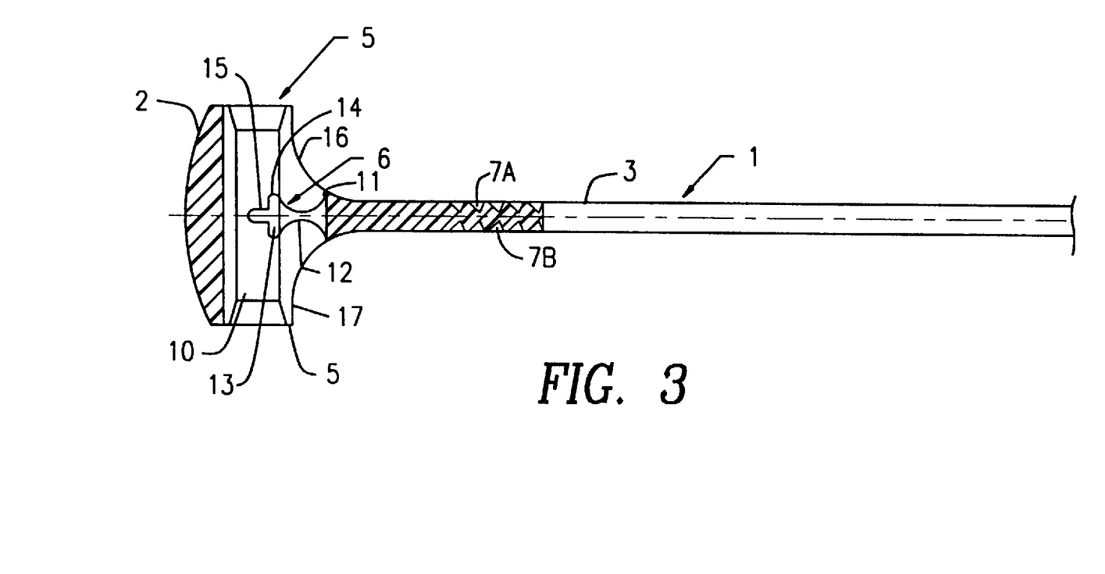
FIG. 3 shows an enlarged sectional view of the head part of the strap shown in FIG. 2.
Figure 4:
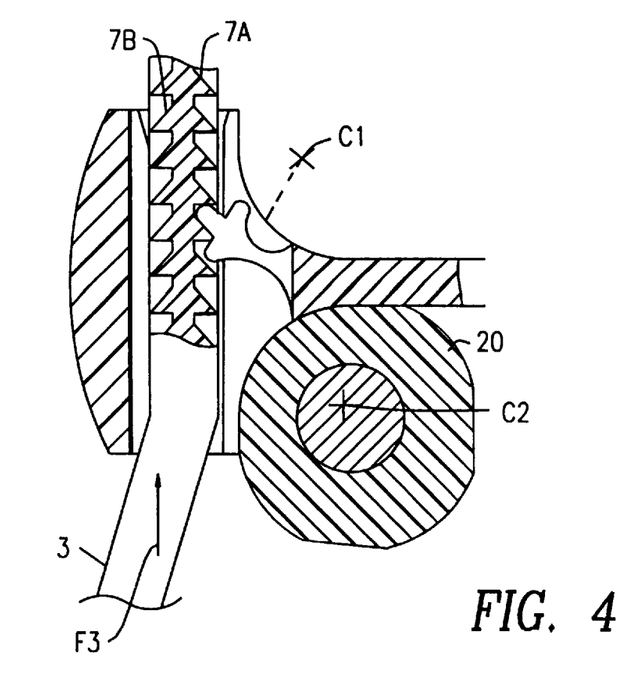
FIG. 4 shows a partial view of what is shown in FIG. 3, in the operational condition.

With reference to FIGS. 3 and 4 there will be shown with more details the strap according to the invention. Reference numbers equal to those of FIGS. 1 and 2 shown corresponding parts.

The symmetrical head 2 comprises a channel 10 with symmetrical entry openings 5, for the passage of the tail 3. At the interior of the channel 10 there is provided a ridge for the positioning of the toothing 7A, 7B of the tongue 3, and a tab or movable retaining tooth or pawl 6 on a virtual hinge comprising a root 11 radiuses to the body of the head 2, a thinned part 12 with two shoulders 13 and 14, and a locking tooth proper 15.

During the locking operation, the whole of the retaining tooth 6 may rotate either in a clockwise or counterclockwise direction with respect to the rest position shown in FIG. 3 according to the direction of introduction of the tongue 3 within the cavity provided in the head 2.

The parts 16, 17 of connection of the head 2 with the tail 3 are radiuses for decreasing the stresses as described above.

In FIG. 4, there is shown the structure of FIG. 3 in one of the two possible locking conditions. For simplicity of disclosure, there is shown only one locking condition; the other locking condition is mirror-like symmetrical, owing to the symmetry of the locking structure according to the invention, i.e., it is a simple mirror image that will not be disclosed in detail.

In this FIG. 4, the cable tie strap is shown in a locking condition in which the retaining tooth 6 is shown in the direction of the introduction of the tail 3 in direction shown by the arrow F3. An introduction of the retaining of the retaining tooth 6 that prevents the extraction of the tail 3.

Figure 5:
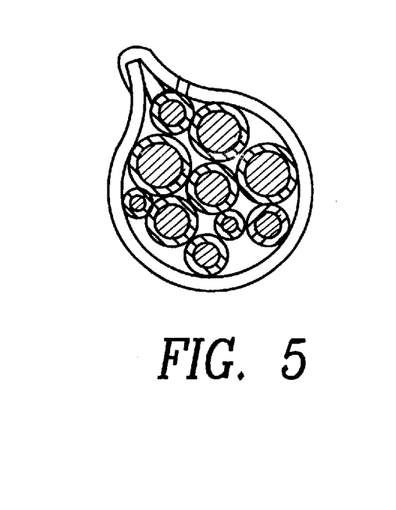
FIG. 5 shows a sectional view of the locking arrangement of the cable tie strap in an operative condition of binding of a bundle of cables.

The radiused parts 16, 17 on centers C1, C2 allow, as stated above, the structure to be rendered more rugged, and also allow a better mating with the ables of the bundle, one of which is shown in 20. The assembly situation is shown in FIG. 5 and a further explanation is deemed unnecessary.

In FIGS. 6A to 6D there is shown a second embodiment of the present invention, relating to the head 2. Since the modification sown in FIGS. 6A–6D relates only to the locking tooth or pawl 6, there will be disclosed in detail only the structure of the latter, leaving out the remainder of the head 2, which is identical to what has been disclosed hereinbefore.

For a better understanding of the modifications according to FIGS. 6A–6D, it is advisable to mention a problem that appears with the conventional cable tie straps and also in those described above.

When the cable tie strap has been locked, the strength necessary for the locking is concentrated, in practice, in the virtual hinge part 6 (FIG. 3). This part 6 cannot be too strong, otherwise the introduction and locking operation for the strap would be difficult. At the same time it cannot be too yielding, otherwise the quantity of material that has strength in the fastening step would be insufficient. The structure and dimensioning of part 6 constitutes therefore a critical element in the design and production of this kind of cable tie straps.

The structure shown in FIGS. 6A–6D enables this problem to be overcome.

As it is shown in these Figures, the locking tooth 6' comprises a root part 20 connected with an elastic hinge 21 to a locking body proper shaped as a symmetrical polygonal star. This locking body comprises shadings 22, 22'; 23, 23; 24, 24'. As it is shown in FIG. 6B, during the insertion operation of the tongue within the head 2, the body 6' rotates to the left allowing the passage of the tongue 3 and of the tooth 7A. In this connection, owing to the flexibility of the elastic or virtual hinge 21, the shapings 23', 24' will be carried outside the outline of the tooth 7A, allowing the introduction of the tongue 3 in the direction shown by the arrow F4.

Figure 6A:
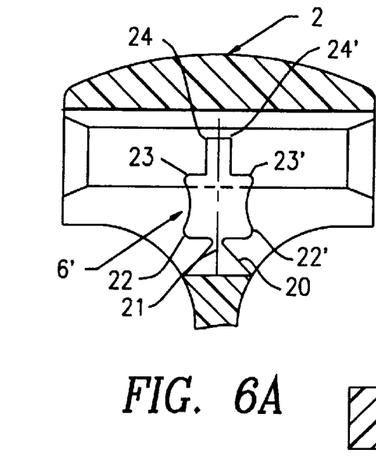
FIGS. 6A, 6B, 6C and 6D show a second embodiment of the locking head of the cable tie strap according to the invention.
Figure 6B:
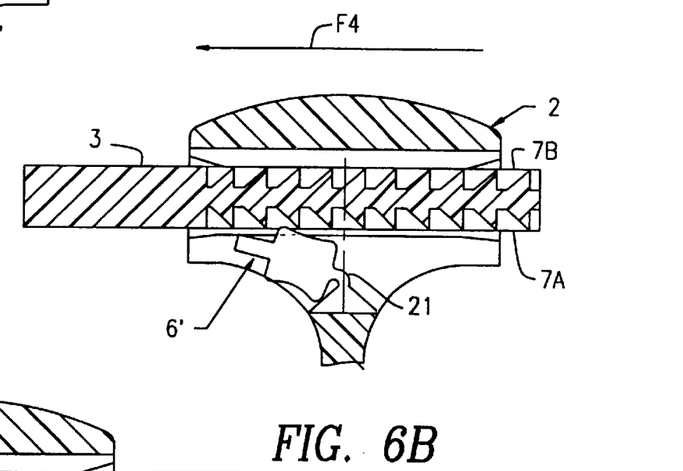
Figure 6C:
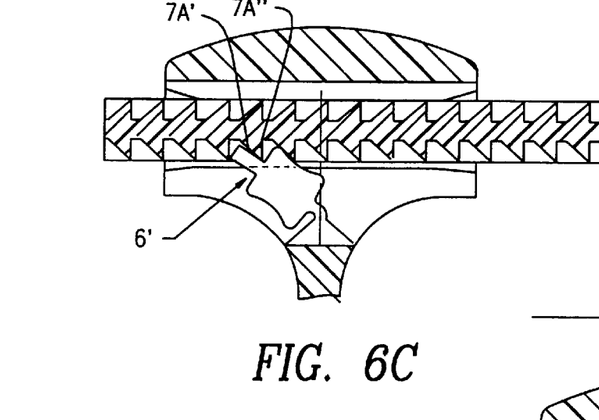

In the condition of simple engagement, the tail 6 will have two teeth 7A', 7A", in engagement with the shapings 24' and 23' (see FIGS. 6A and 6C). In this way the positioning is much more stable with respect to the conventional construction.

In condition of finished fastening and/or particular stresses when the cable tie strap is in the operational condition, stressed by the force indicated by the arrow F5, the locking tooth 6' will be in engagement with the shapings 24', 23' with the tooth 7A', 7A", but owing to the yielding of the elastic hinge 21 the shaping 22 will rest against the left part of the root 20. In this way the strength to the tear of the tail 6' will be assured not by the hinge 21 as in the conventional construction, but by the interlocking of the shapings 24, 23', to teeth 7A', 7A", shaping 22 and root 20. Consequently the strength to the tear will be guaranteed by the strength of the tongue 6 and not by the hinge 21 with an increase of reliability of the binding extremely higher than that of the conventional cable tie straps.

It will be clear that the construction and the operational principle of the construction according to FIGS. 6A–6D may also be applied to asymmetrical cable tie straps of the conventional kind.

Figure 7:
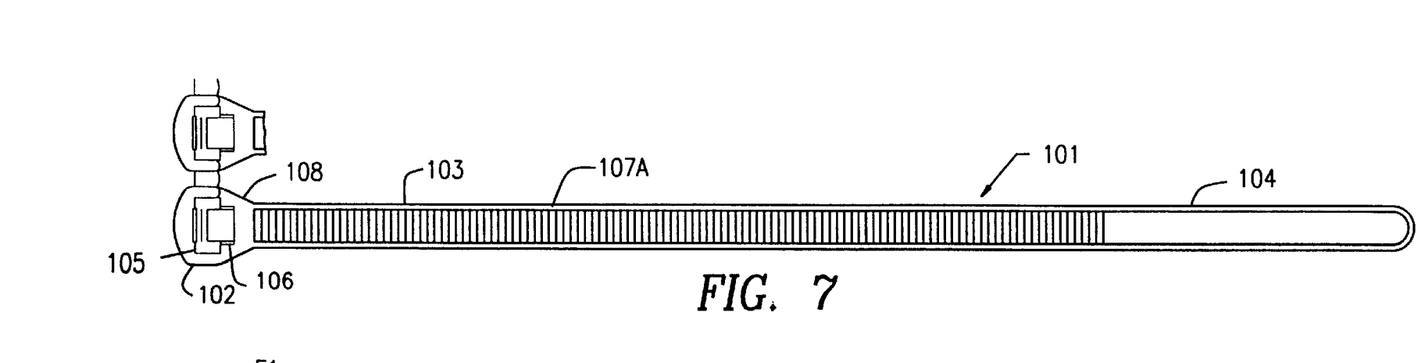
FIG. 7 shows a plan view of another embodiment of the self-locking cable tie strap having a symmetrical structure according to the present invention.
Figure 8:
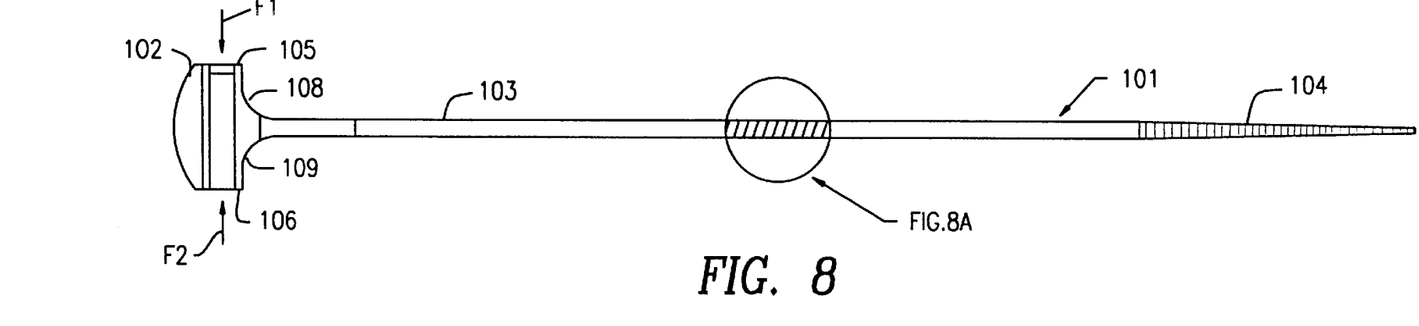
FIG. 8 shows a lateral view, partially sectioned of the cable tie strap of FIG. 7.
Figure 8A:
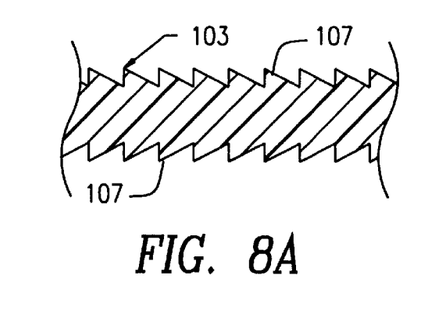
FIG. 8A shows an enlarged detail of the step shown in FIG. 8.

With reference to the drawings and in particular to FIGS. 7, 8, 8A, the cable ties strap shown as a whole in 101 comprises a symmetrical head part 102, shaped as a hammer and a tail part 103 ending in a tail end 104. As it will be better shown in the following, both the head 102, and the tail 103 have a mirror-like symmetrical structure, thanks to which the tail end 104 of the strap 101 may be inserted within the locking cavity 105 of the head 102 either on the right side or on the left side, as it is shown by the arrows F1, F2 in FIG. 8. The locking action of the tongue 103 within the head 102 is performed by effect of the positive locking by a symmetrical tooth or pawl 106 that cooperates with a double sawtooth toothing 107A, 107B realized on both the larger sides of the tail 103. As it is usual, the tail end 104 of the strap 101 is without toothing and tapered to facilitate its insertion into the head 102 of the strap 101 in the initial steps of the locking operations of a bundle of cables or conductors.

In a preferred embodiment, the connection part 108, 109 is radiused with a radius R for a better distribution of the bending stresses at the moment of locking of the strap on a bundle of cables and for preventing its breakage near the head owing to large stresses that may occur, as mentioned above, at the moment of fastening, or during the useful life of the strap in the operative conditions.

Figure 9:
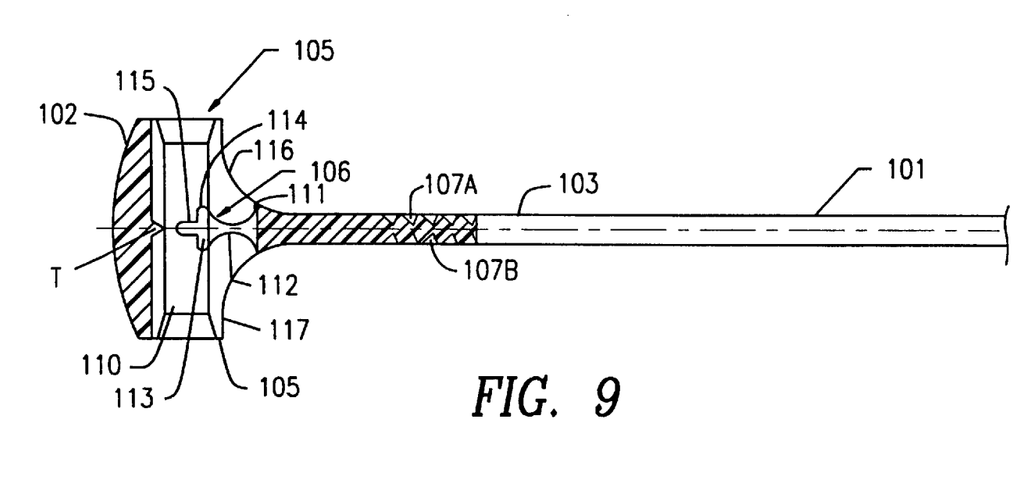
FIG. 9 shows an enlarged sectional view of the head part of the strap shown in FIG. 8A.
Figure 10:
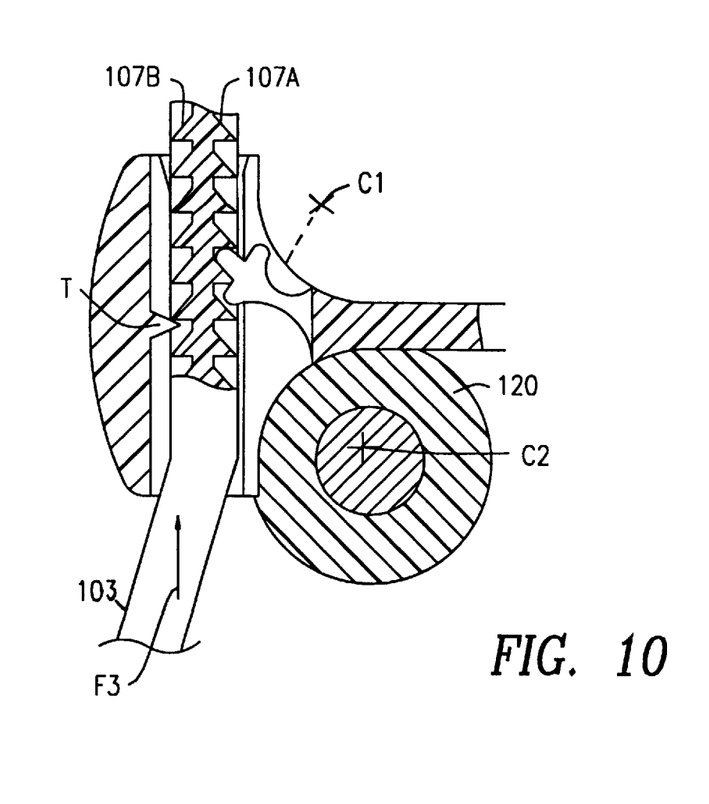
FIG. 10 shows a partial view of what is shown in FIG. 9, in the operational condition.
Figure 11:
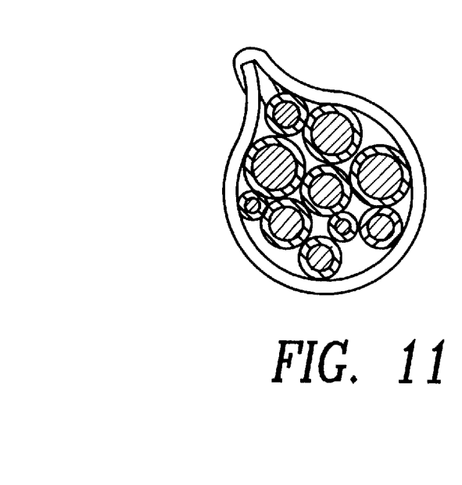
FIG. 11 shows a sectional view of the locking arrangement of the cable tie strap in an operative condition of binding of a bundle of cables.

With reference to FIGS. 9 and 10 there will be shown with more details the strap according to the invention. Reference numbers equal to those of FIGS. 7 and 8 show corresponding parts.

The symmetrical head 102 comprises a channel 10 with symmetrical entry openings 105, for the passage of the tail 103. At the interior of the channel 110 there is provided a ridge for the positioning of the toothing 107A, 107B of the tongue 103, and a tab or movable retaining tooth or pawl 106 on a virtual hinge comprising a root 111 radiused to the body of the head 102, a thinned part 112 with two shoulders 113 and 114, and a locking tooth proper 115. In addition there is provided a positioning tooth T located substantially opposite to the locking tooth 115.

During the locking operation, the whole of the retaining tooth 106 may rotate either in a clockwise or counterclockwise direction with respect to the rest position shown in FIG. 9 according to the direction of introduction of the tongue 103 within the cavity provided in the head 102.

The parts 116, 117 of connection of the head 102 with the tail 103 are radiused for decreasing the stresses as described above.

In FIG. 10 there is shown the structure of FIG. 9 in one of the two possible locking conditions. For simplicity of disclosure, there is shown only one locking condition; the other locking condition is mirror-like symmetrical, owing to the symmetry of the locking structure according to the invention, i.e., it is a simple mirror image that will not be disclosed in detail.

In this FIG. 10, the cable tie strap is shown in a locking condition in which the retaining tooth 106 is shown in the direction of the introduction of the tail 103 in direction shown by the arrow F3. An introduction of the tail 103, with the symmetrical toothing 107A, 107B causes the retaining of the retaining tooth 106 that prevents the extraction of the tail 103.

The radiused parts 116, 117 on centers C1, C2 allow, as stated above, the structure to be rendered more rugged, and also allow a better mating with the cables of the bundle, one of which is shown in 20. The assembly situation is shown in FIG. 5 and a further explanation is deemed unnecessary.

In FIGS. 12A to 12D there is shown a second embodiment of the present invention, relating to the head 102. Since the modification shown in FIGS. 12A–12D relates only to the locking tooth or pawl 106, there will be disclosed in detail only the structure of the latter, leaving out the remainder of the head 102, which is identical to what has been disclosed hereinbefore.

For a better understanding of the modifications according to FIGS. 12A–12D, it is advisable to mention a problem that appears with the conventional cable tie straps and also in those described above.

When the cable tie strap has been locked, the strength necessary for the locking is concentrated, in practice, in the virtual hinge part 106 (FIG. 9). This part 106 cannot be too strong, otherwise the introduction and locking operation for the strap would be difficult. At the same time it cannot be too yielding, otherwise the quantity of material that has strength in the fastening step would be insufficient. The structure and dimensioning of part 106 constitutes therefore a critical element in the design and production of this kind of cable tie straps.

The structure shown in FIGS. 12A–12D enables this problem to be overcome.

Figures 12A, 12B, 12C, 12D:
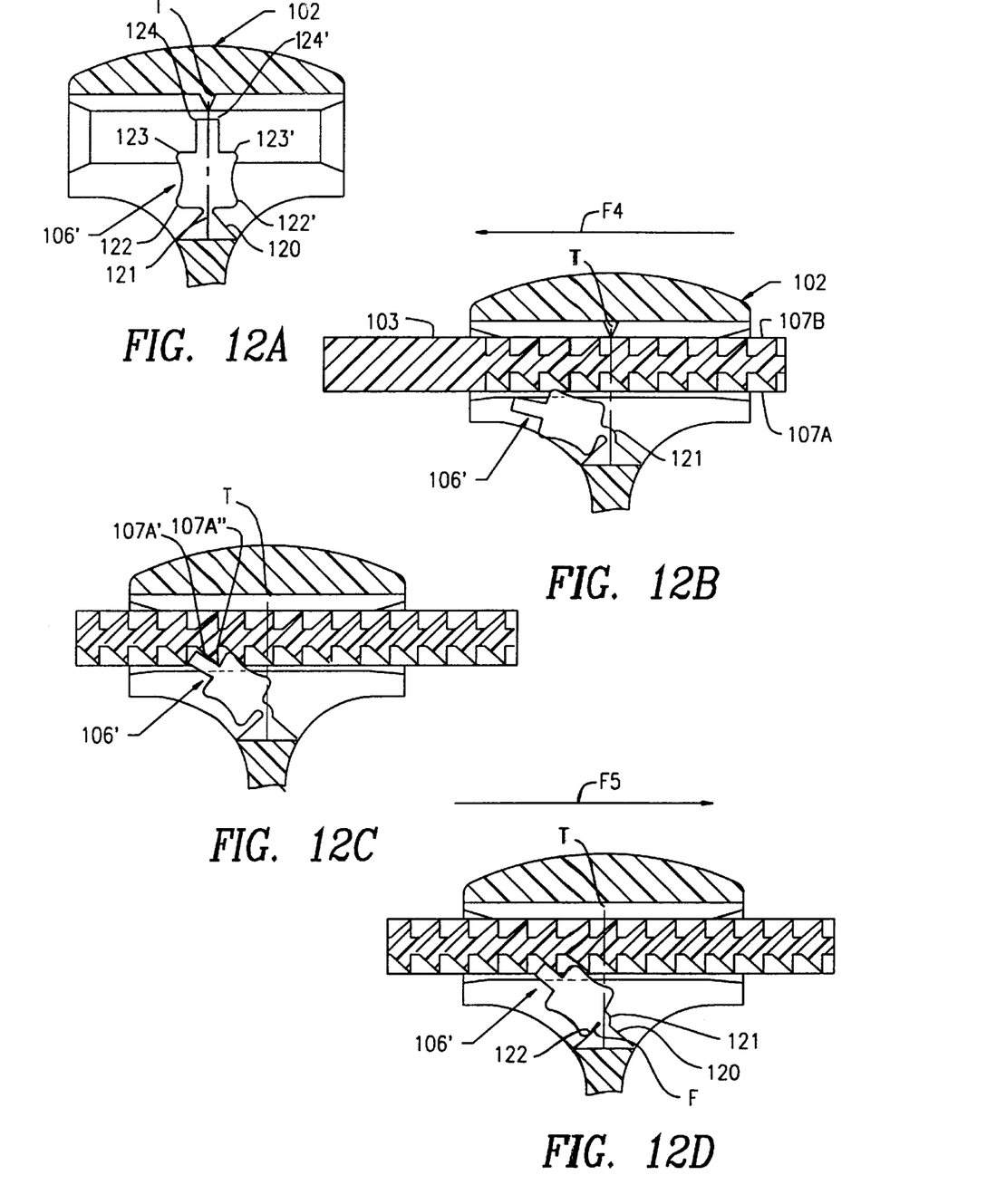
FIGS. 12A, 12B, 12C and 12D show a further embodiment of the locking head of the cable tie strap according to the invention.

As it is shown in these figures, the locking tooth 106' comprises a root part 120 connected with an elastic hinge 121 to a locking body proper shaped as a symmetrical polygonal star. This locking body comprises shaping 122, 122'; 123, 123'; 124, 124'. As it is shown in FIG. 12B, during the insertion operation of the tongue within the head 102, the body 106' rotates to the left allowing the passage of the tongue 103 and of the tooth 107A. In this connection, owing to the flexibility of the elastic or virtual hinge 121, the shapings 123', 124' will be carried outside the outline of the tooth 107A, allowing the introduction of the tongue 103 in the direction shown by the arrow F4.

In the condition of simple engagement, the tail 106 will have two teeth 107A', 107A", in engagement with the shapings 124' and 123' (see FIGS. 12A and 12C). In this way the positioning is much more stable with respect to the conventional construction.

In condition of finished fastening and/or particular stresses when the cable tie strap is in the operational condition, stressed by the force indicated by the arrow F5, the locking tooth 106' will be in engagement with the shapings 124', 123' with the tooth 107A', 107A", but owing to the yielding of the elastic hinge 121 the shaping 122 will rest against the left part of the root 120. In this way the strength to the tear of the tail 106' will be assured not by the hinge 121 as in the conventional construction, but by the interlocking of the shapings 124, 123', to teeth 107A', 107A", shaping 122 and root 120. Consequently the strength to the tear will be guaranteed by the strength of the tongue 106 and not by the hinge 121 with an increase of reliability of the binding extremely higher than that of the conventional cable tie straps.

It will be clear that the construction and the operational principle of the construction according to FIGS. 12A–12D may also be applied to asymmetrical cable tie straps of the conventional kind.

Figure 13:
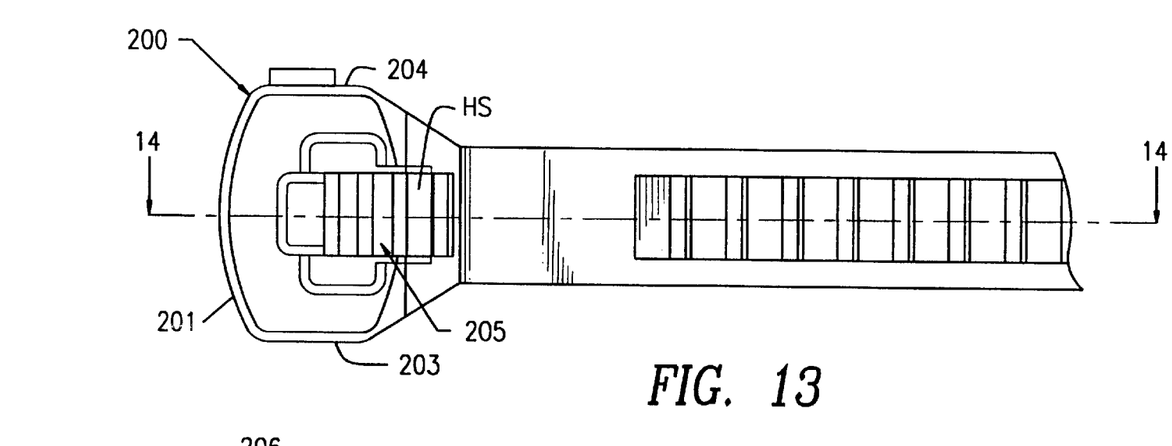
FIG. 13 shows a further embodiment of the self-locking cable tie strap having a symmetrical structure according to the present invention; in plan view.
Figure 14:
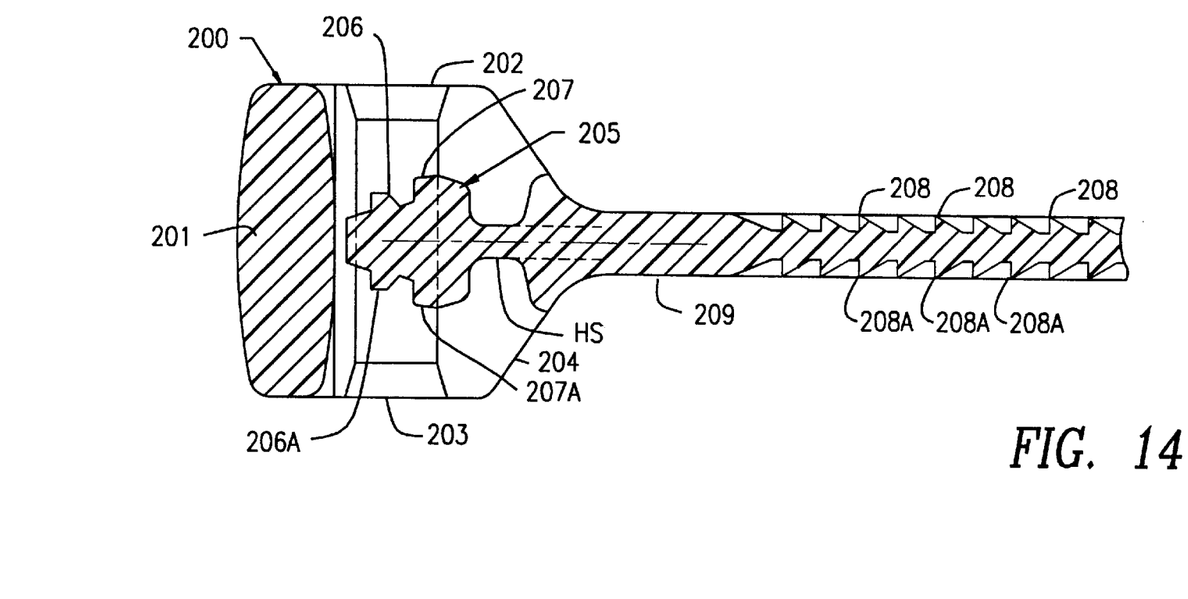
FIG. 14 shows a sectional view of the cable tie strap of FIG. 13, taken along plane 14—14.
Figure 14A:
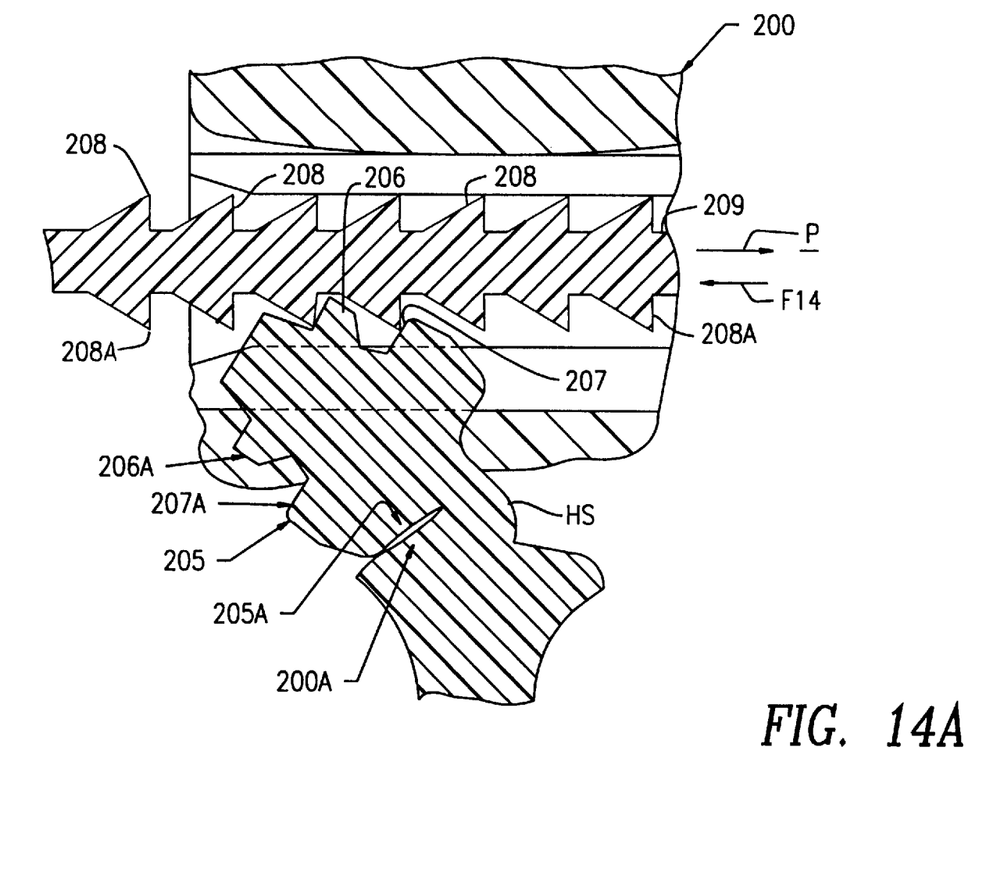
FIG. 14A is a partial view that shows the relationship of the parts of the tie strap of FIGS. 13 and 14 in their operative condition.

With reference to FIGS. 13, 14 and 14A a further embodiment of the self-locking tie strap according to the present invention will now be disclosed.

Figure 6D:
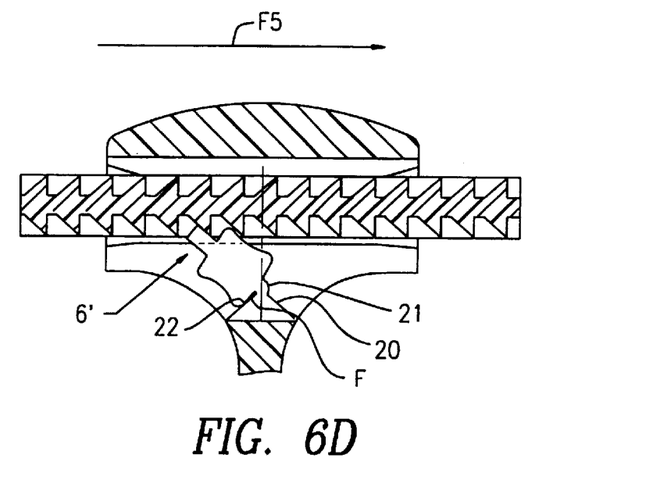

The head 200 of this tie strap is somewhat similar to the one disclosed with reference to FIGS. 6A and 6D. The head 200 comprises a head part 201 coupled with bars 202, 203 to a connection body 204 that supports a tongue or pawl 205 carried by a hinge stem HS. The tongue or pawl 205 is provided with pairs of symmetrical teeth 206, 207 and 206A, 207A, arranged to mate with a toothing 208, 208A, provided on the tail part 209 of the tie strap. The structure id designed so that the tongue or pawl 205 in the locked condition engages a pair of the teeth of the toothing 208, 208A depending on the direction of insertion of the tail 209 within the head 200. The general operation of the structure should be clear from the foregoing description and will not be repeated here.

With reference to FIG. 14A now the specific operation of the tie strap shown in FIGS. 13 and 14 will be disclosed.

In FIG. 14A the same references quoted in FIGS. 13 and 14 will indicate the same parts.

The tail part 209 inserted into the head 200 along the direction shown by the arrow F14 will bring the teeth 208 along the cavity defined in the head 200. The series of teeth 208A will engage the teeth 206, 207 of the tongue or pawl 205, if the tail part 209 is inserted along the direction of the arrow F14 (shown pointing to the left in FIG. 14A). The converse will occur with teeth 208 and the teeth 206A, 207A if the tail is inserted in a direction opposite to that of the arrow F14, i.e. from the left in FIG. 14A.

When a pull force schematically represented by the arrow P is exerted on the tail 209 caused by the binding force on a bundle of cables as previously disclosed, the hinge stem HS will undergo an elastic deformation so that two teeth of the series 208A will engage both the teeth 208 and 207 provided on the pawl 205. At the same time owing to the elastic yield of the hinge stem HS, a part 205A will rest against the body of the head of the strap shown in 200A. In this way the force exerted by the pull force P will be distributed on three points (208A-206; 208A-207; 205A-200A), thus relieving any stress on the hinge stem HS that substantially in such condition performs the sole operation of keeping the parts 200, 208A, 205 in the correct position for an advantageous distribution of the forces in play.

In this way the hinge stem HS may be manufactured so that it is more elastically pliable. This fact proves advantageous when these tie straps are utilized with automatic insertion tools.

Figure 15:
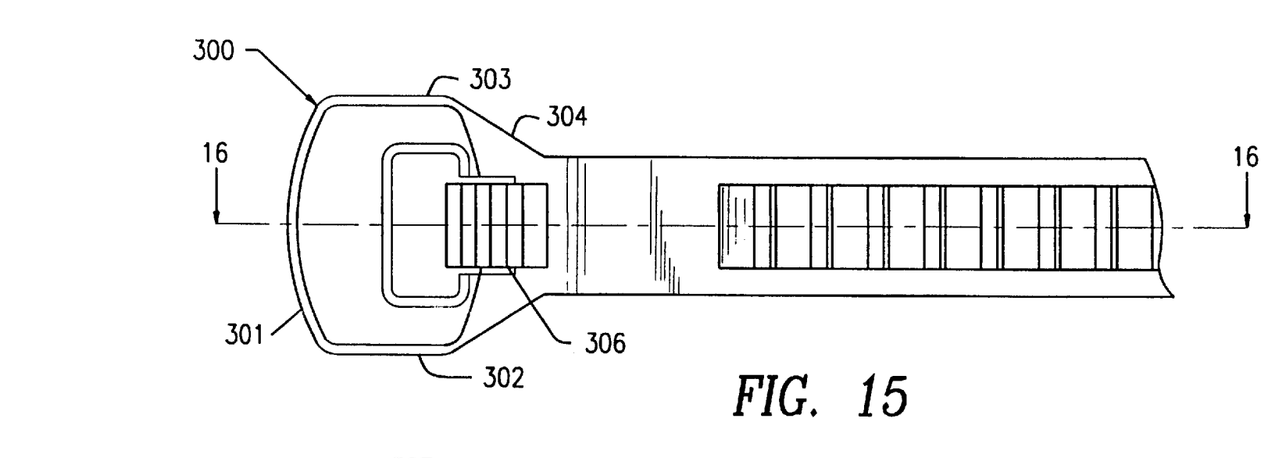
FIG. 15 shows yet another embodiment of the self-locking tie strap having a symmetrical structure according to the present invention in plan view.
Figure 16:
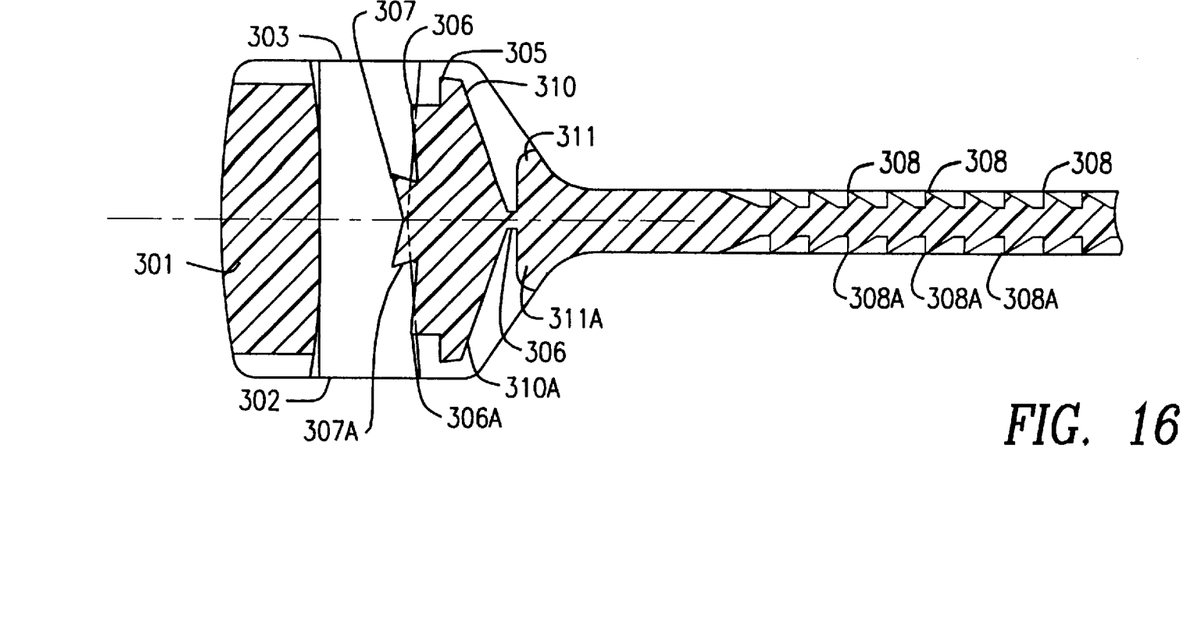
FIG. 16 shows a sectional view of the cable tie strap of FIG. 15, taken along plane 16—16.

With reference now to FIGS. 15 and 16, a further embodiment of the self-locking tie strap according to the present invention will be disclosed.

The head 300 of this tie strap is also similar to the one disclosed with reference to FIGS. 6A to 6D. The head comprises a head part 301 coupled with bars 302, 303 to a connection body 304 that supports a tooth or pawl 305 carried by a hinge stem 306. The tooth or pawl 305 is provided with pairs of symmetrical teeth 306, 307 and 306A, 307A, arranged to mate with a toothing 308, 308A provided on the tail part 309 of the tie strap. The structure is designed so that the tooth or pawl 305 in the locked condition engages a pair of the teeth of the toothing 308, 308A depending on the direction of insertion of the tail 309 withing the head 300.

In this embodiment the hinge stem 306 is made relatively thin in order to reduce the insertion force for the tail 309 within the head 300. The stresses due to the binding action are counteracted by ridges 310, 311 and 310A, 311A that rest one against the other relieving from excessive stresses the hinge stem 306.

Figure 17:
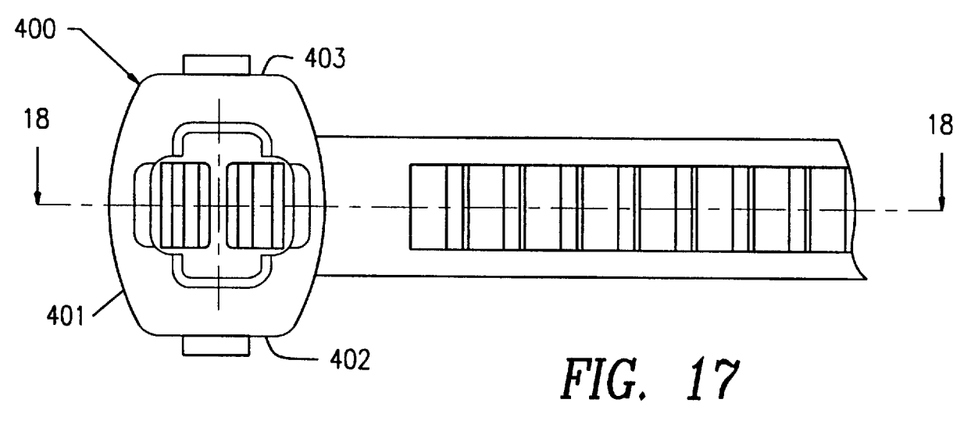
FIG. 17 shows yet another embodiment of the self-locking tie strap having a doubly symmetrical structure according to the present invention, in plan view.
Figure 18:
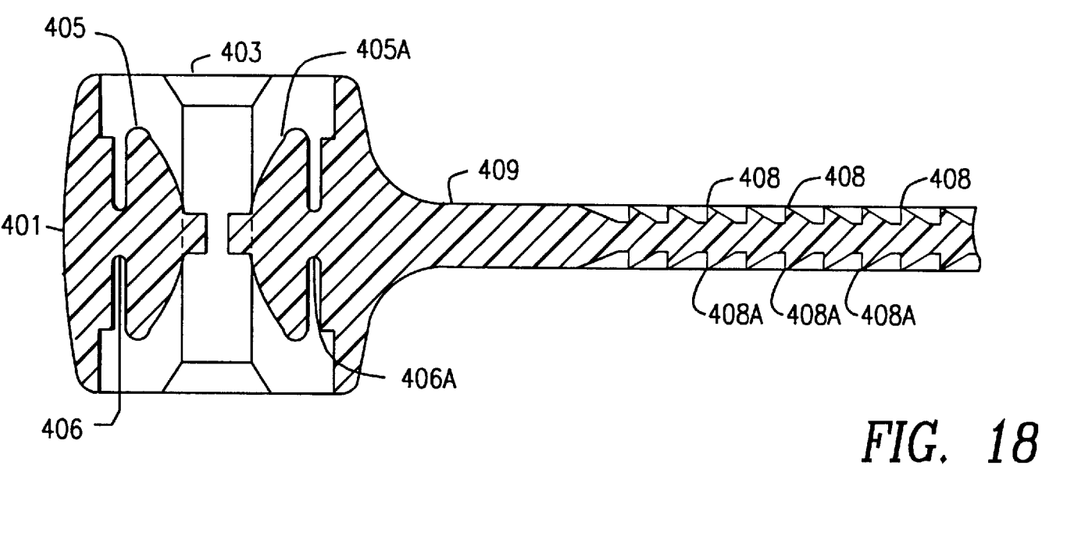
FIG. 18 shows a sectional view of the tie strap of FIG. 17, taken along plane 17—17.

With reference now to FIGS. 17 and 189, a further embodiment of the self-locking tie strap according to the present invention will be disclosed, and that has a head with a doubly symmetrical structure.

The head 400 comprises a head part 401 coupled with bars 402, 403 to a connection body 404. Both the head part 401 and the connection body 404 each support a tongue or pawl 405, 405A, respectively, carried by hinge stems 406, 406A. The teeth provided on the pawls 405, 405A are arranged to engage in the locked condition with a tooth on each side of the toothings 408, 408A provided on the tail part 409 regardless of the direction of insertion of the tail 409 within the head 400.

In this way there is a symmetry of operation insofar as the insertion of the tail into the head is concerned and also a symmetrical distribution of the stresses due to the binding action when the tie strap is in the operative condition. The same considerations above discussed with reference to FIG. 14A will be valid for this embodiment and a further discussion is considered not necessary.

Figure 19:
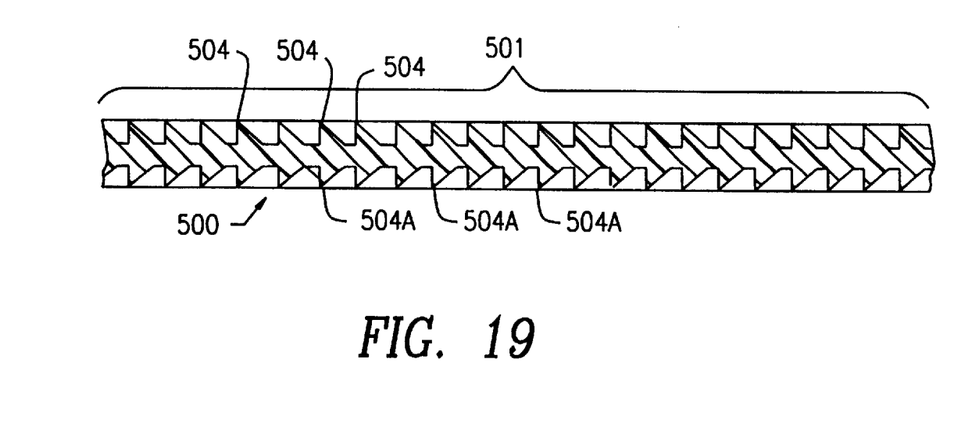
FIGS. 19 and 20 show a sectional view of a modified tail part for the above tie straps having an irreversible locking toothing and a reversible locking toothing in its terminal part.
Figure 20:
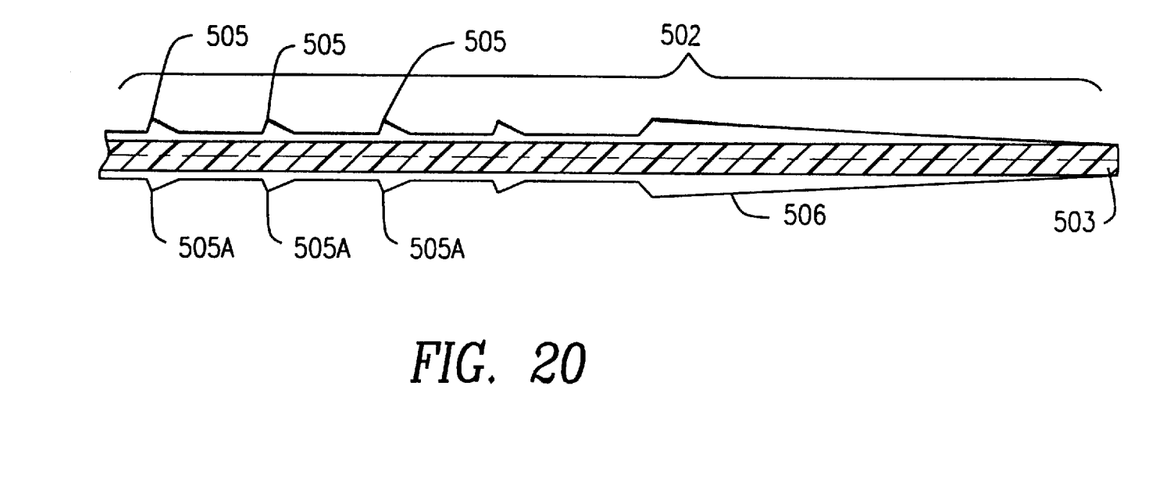

Now, with reference to FIGS. 19 and 20 a modified tail part convenient for use in the above tie straps will be disclosed.

As it is well known to a person skilled in the art, when tie straps of the type in question are used, often the operator encircles a bundle of cables or wires with a tie strap in a slack condition and subsequently performs the tightening of the tie straps in the desired position along the bundle.

With the irreversible lock tie straps known in the art, an extra tie strap too many, even if placed in a slack condition, cannot be removed if considered unnecessary, owing to the irreversible mechanism due to the cooperation between locking pawl and toothing on the tail. An unnecessary tie strap can only be removed by cutting it and throwing it away as scrap with a loss of money.

The tail for tie straps shown in FIGS. 19 and 20 allows a preliminary releasable (non-irreversible) placement of the tie straps when these are not completely tightened in order to remove any unnecessary tie strap permitting that the same be reused for another strapping of cables of wires.

The tail part shown in FIGS. 19 and 20, shown generally in 500, comprises a first part 501 adjacent to the head of the tie strap (not shown) and a second part 502 adjacent to the very end 503 of the tail.

The first part 501 is provided on both sides with toothings 504, 504A that engage irreversibly with the pawl or pawls provided in the head of the tie strap, and with a number of gently sloped teeth 505, 505A on the part 052. The slope at the left in FIG. 20 is such that an irreversible locking does not occur and the partially inserted or slack part of the tail may be removed, if necessary, from the head of the tie strap.

Further, the very end 503 of the tail 500 is provided with a taper 506 to facilitate the insertion of the end 503 of the tail 500 into the gap on the head of the tie strap, gradually overcoming the elasticity of the relatively stiff pawl or pawls.

Various other modifications to the foregoing disclosed embodiments will now be evident to those skilled in the art. Thus, the particularly described preferred embodiments are intended to be illustrative and not limited thereto. The true scope of the invention is set forth in the following claims.

What is claimed is:

1. A device for bundling one or more cables comprising:

an elongate cable tie having a tail at one end, a head at the other end and an elongate strap body therebetween; said strap body including strap teeth along opposed longitudinal surfaces thereof;

said head having an elongate opening therethrough for insertable accommodation of said tail alternatively in opposed directions, said head opening being defined by a base head wall extending therealong; and a deflectable locking element extending from said base head wall and into said head opening, said locking element including a deformable movable hinge attached to said base head wall and a locking pawl including a locking pawl tooth for locking engagement with said strap teeth on either longitudinal surface of said strap body;

said locking pawl further including a contacting part for engagement with said base head wall for restricting said deformable movement of said hinge upon said insertion of said tail through said head opening.

2. A device of claim 1 wherein said locking element includes a pair of said pawl teeth, each said pawl tooth being oppositely directed for alternative locking engagement with said strap locking teeth of one of said opposed longitudinal surfaces upon said insertion of said tail through said head opening in one of said alternative opposed directions.

3. A device of claim 1 wherein said locking element further includes a pair of said contacting parts, each of said contacting parts being oppositely directed and adjacently spaced from each of said pawl teeth, said contacting parts being alternatively engageable with said base head wall upon said insertion of said tail through said head opening in one of said alternative opposed directions.

4. A device of claim 3 wherein said contacting parts of said locking element are positioned such that one said contacting part of said pair is engageable with said base head wall and said other contacting part is engageable with said strap teeth of one of said opposed longitudinal surfaces.

5. A device of claim 1 wherein said locking element is integrally formed with said head.

6. A device of claim 5 wherein said head is integrally formed with said strap body and wherein said tie includes a connection location therebetween having a symmetrical radius.

7. A device of claim 1 wherein said locking element is symmetrically formed about a center line.

8. A device of claim 1 wherein said head opening includes a further head wall spaced from and opposite said base head wall, said further head wall including inwardly directed engagement member opposed to said locking element for supporting said strap therebetween.

9. A device of claim 8 wherein said engagement member includes a depending flexible positioning tooth extending from said further head wall for engagement with said strap teeth on one of said longitudinal structures opposite said longitudinal surface in engagement with said pawl.

10. A device of claim 9 wherein said positioning tooth extends centrally adjacent said locking element.

11. A cable tie comprising:

an elongate cable tie strap having teeth extending along opposed longitudinal surfaces;

a tail at one end of said strap;

a head at the other end of said strap, said head having an elongate passageway therethrough extending transverse to said elongate cable tie strap and having a pair of opposed passageway openings and a bottom wall adjacent said strap extending therebetween, said tail being insertable through either of said passageway openings;

a locking element extending from said bottom wall into said passageway for locking engagement with said teeth of one of said opposed longitudinal surfaces.

12. A cable tie of claim 11 further includes an upper wall of said head passageway spaced from said bottom wall, said upper wall including an engagement member extending therefrom for engagement with said strap teeth on said other longitudinal surface.

* * * * *